(12) United States Patent
Harp et al.

(10) Patent No.: US 9,358,458 B2
(45) Date of Patent: Jun. 7, 2016

(54) SYSTEM AND METHOD FOR PROVIDING OPTIONAL COMMITMENTS TO PLAYERS WITHIN A VIDEOGAME

(75) Inventors: Derek Harp, San Mateo, CA (US); Bengt Gregory-Brown, Springfield, OH (US)

(73) Assignee: MASLOW SIX ENTERTAINMENT, INC., San Mateo, CA (US)

( * ) Notice: Subject to any disclaimer, the term of this patent is extended or adjusted under 35 U.S.C. 154(b) by 1390 days.

(21) Appl. No.: 12/851,788

(22) Filed: Aug. 6, 2010

(65) Prior Publication Data

US 2012/0034971 A1 Feb. 9, 2012

(51) Int. Cl.
*A63F 13/55* (2014.01)
*A63F 13/40* (2014.01)
*G06Q 30/02* (2012.01)

(52) U.S. Cl.
CPC ............ *A63F 13/10* (2013.01); *G06Q 30/0209* (2013.01); *A63F 13/55* (2014.09)

(58) Field of Classification Search
CPC ......... A63F 13/10; A63F 13/45; A63F 13/55; G06Q 30/0209
USPC .............................. 463/23, 40–42, 29; 705/37
See application file for complete search history.

(56) References Cited

U.S. PATENT DOCUMENTS

| | | | |
|---|---|---|---|
| 7,666,095 B2 | 2/2010 | Van Luchene | 463/29 |
| 7,677,974 B2 | 3/2010 | Van Luchene | 463/29 |
| 7,686,691 B2 | 3/2010 | Van Luchene | 463/29 |
| 2007/0191104 A1 * | 8/2007 | Van Luchene | 463/42 |

* cited by examiner

*Primary Examiner* — Damon Pierce
(74) *Attorney, Agent, or Firm* — Pillsbury Winthrop Shaw Pittman LLP (57) ABSTRACT

Optional commitments may be provided to players within a videogame. The optional commitments commit players to perform and/or abstain from certain actions within the videogame. The players may be rewarded for accepting commitments. The players may be penalized for failing to fulfill commitments. This model for rewarding optional behaviors may provide an alternative for incenting actions within a videogame to conventional models in which players are rewarded and/or penalized only after attempting an activity or activities.

20 Claims, 7 Drawing Sheets

SYSTEM AND METHOD FOR PROVIDING OPTIONAL COMMITMENTS TO PLAYERS WITHIN A VIDEOGAME

FIELD OF THE INVENTION

The invention relates to the provision of optional commitments to players within a videogame wherein acceptance of the optional commitments provides benefits to the players and failure to fulfill accepted commitments results in the assessment of penalties to the players.

BACKGROUND OF THE INVENTION

Providing tasks or challenges within a videogame for players to perform may be known. In conventional videogames, incentives for performing these tasks or challenges may be provided to players subsequent to completion of the task or challenge. Generally, the player may not be provided with a benefit of performing a task or challenge until the player has completed the task or challenge. While this approach may be somewhat successful in influencing player behavior, and may mimic some types of transactions in the real world, it may be somewhat limited.

SUMMARY

One aspect of the invention relates to a system and method that present optional commitments to players within a videogame. The optional commitments commit players to perform and/or abstain from certain actions within the videogame. The players may be rewarded for accepting commitments. The players may be penalized for failing to fulfill commitments. This model for rewarding optional behaviors may provide an alternative for incenting actions within a videogame to conventional models in which players are rewarded and/or penalized only after attempting an activity or activities. The provision of the optional commitments in the videogame may enhance the sense of presence experienced by the players, may enhance relationships and/or cooperation between players, may enhance the realism of some relationships and/or transactions within the videogame, and/or may provide other enhancements within the videogame.

In some implementations, the system may include one or more processors executing computer program modules to provide the videogame to the users. The one or more processors may be located on one or more servers and/or one or more client computing platforms. The one or more computer program modules may include one or more of a game module, a commitment module, an invitation module, a benefit module, a performance monitoring module, a timing module, a performance evaluation module, a penalty module, and/or other modules.

The game module may be configured to provide the videogame to players. The videogame may take place within a virtual space. The virtual space may be hosted, served, and/or otherwise provided by the game module. To provide the videogame to players, the game module may generate views of the videogame (and/or the virtual space) that enable players to participate in the videogame.

The commitment module may be configured to manage commitment criteria associated with commitments to be provided to players within the videogame. This may include managing sets of commitment criteria associated with individual commitments. The set of commitment criteria associated with a given commitment may include one or more of a name, activity criteria, temporal criteria, benefit criteria, penalty criteria, and/or other criteria.

The activity criteria associated with a commitment may define one or more actions within the videogame. For example, the actions may include traveling to one or more specific locations within the virtual space, fighting (generally or a specified opponent or opponent class), praying, training, trading, crafting, fishing, protecting an object and/or place in the virtual space, wearing or carrying (by virtue of a controlled avatar wearing or carrying) an icon, emblem, token, and/or other object, and/or other actions.

The activity criteria associated with the commitment may indicate whether an action is to be performed and/or abstained from to satisfy the commitment. Commitments for which the activity criteria only define actions to be performed may be referred to as prescriptive commitments. Commitments for which the activity criteria only define actions to be abstained from may be referred to as proscriptive commitments.

The temporal criteria associated with a commitment may designate a time window or windows during which actions defined by the activity are to be performed and/or abstained from in order to fulfill the commitment. The temporal criteria may designate, for example, one or more of a commencement of a time window, a duration of a time window, a conclusion of a time window, and/or other parameters of the time window.

A commitment may be a recurring commitment, a non-recurring commitment, and/or other types of commitments. A recurring commitment may be a commitment having temporal criteria that designate a plurality of time windows that occur again and again within the videogame in a recurring manner. A recurring commitment may still end at some point (e.g., at the occurrence of some event that ends the commitment) after a plurality of time windows have occurred. A non-recurring commitment may be a commitment having temporal criteria that designate a single time window.

In designating the commencement of a time window for a commitment, temporal criteria may designate game circumstances that trigger commencement of the time window. The circumstances may include actions performed by the player accepting the commitment, actions performed by other players, actions performed by non-player characters, events in the virtual space, and/or other circumstances in the game. For example, a player may accept a commitment to aid a specific character (or set of characters) in the videogame whenever they give some predetermined signal for help. The generation of the predetermined signal for help would trigger the commencement of the time window for this commitment. As another example, a player may accept a commitment to engage in battle and/or defeat a specific character (or set of characters) in the videogame whenever the player encounters the specific character. Encounters of the accepting player with the specific character would trigger commencement of the time window for this commitment. As yet another example, a player may accept a commitment to wear an emblem of, for example, a deity, group, or celebrity within the videogame. If the emblem (and/or the object bearing the emblem) is lost or destroyed, a time window may be triggered during which the player must find a replacement. These examples are not intended to be limiting, and other circumstances within the videogame that trigger time windows are contemplated.

In designating the commencement of a time window for a commitment, temporal criteria may designate a frequency at which time windows for the commitment are commenced. As an example, a player may accept a commitment to perform some specified action (or set of actions) every day, week, fortnight, month, and/or other time period. By way of example, the specified action may include practicing a skill, engaging and/or defeating a specified character (or set of characters), visiting a location within the virtual space, visiting a specified character (or set of characters), and/or other actions.

In designating the commencement of a time window for a commitment, temporal criteria may designate the time of acceptance as the commencement for the time window. For example, a player may accept a commitment to never attack and/or harm a specific character and/or set of characters. The temporal criteria may designate the moment of acceptance (and/or a time after some predetermined delay) as the commencement of the time window for the commitment.

In designating the duration of a time window for a commitment, temporal criteria may designate a length of time for which the time window may extend. The length of time may be a fixed amount of time or a variable amount of time. As an example of a variable amount of time, a player may accept a commitment that involves defeating all of a certain type of character within some distance during the time window. The temporal criteria may include a function that determines the duration of the time window as a function of the number and/or strength of the characters during a given time window.

In designating the conclusion of a time window for a commitment, temporal criteria may designate game circumstances that trigger conclusion of the time window. By way of example, a player may accept a commitment that involves defending a certain character (or set of characters) whenever aid is requested by the character. A time window associated with this commitment may end when the character being defended is no longer in danger (e.g., the attackers have been defeated, the attackers have been outrun and/or avoided, the attackers have retreated, and/or other circumstance in which the character is no longer in danger). As another non-limiting example, a player may accept a commitment to be an ally of a specific character (or set of characters). If the specific character becomes withdrawn from the videogame (e.g., by death, by "travel", and/or other circumstances), the player may no longer be committed to being an ally of the specific character. Similarly, if the specific character betrays the player that accepted the invitation and/or performs some other untoward action, the temporal criteria for the commitment may designate that the time window should be concluded.

It will be apparent that the temporal criteria for a given commitment may not include all of a commencement of a time window, a duration of a time window, and a conclusion of a time window. For example, the temporal criteria for the given commitment may designate a duration of a time window and not a conclusion of a time window, or vice versa.

The benefit criteria associated with the commitments define one or more benefits within the videogame to be received by players for accepting commitments. The benefits may include bonuses in character metrics such as one or more of manna, gold (or other currency), skill or ability metrics, friendship or trustworthiness metrics, and/or other character metrics. The benefits may include virtual objects provided to the player within the virtual space. The virtual objects may be wearable, bearable, storable, tradable, sellable, transferrable, destroyable, usable, inhabitable, ridable, and/or disposable. The virtual objects may include one or more of a rare object, an object with abilities, a protective object, a tool, a weapon, a pet, a vehicle, a mount, and/or other objects.

The benefits may include alliances within the videogame. The alliances may provide the players with access to areas of the virtual space, aid during battle, connections for trade, and/or other benefits. The alliances may be with non-player characters and/or player controlled characters. The benefits may include access to and/or control over places within the virtual space.

The benefits may include new skills and/or abilities such as climbing, swimming, flight, breathing underwater, passing through tangible obstructions (e.g., objects, walls, creatures, and/or other obstructions), partial to complete camouflage and/or invisibility, stealthy activities (e.g., hiding, moving silently, moving in shadow, and/or other activities), accelerated healing, rapid recovery of strength and/or any other recoverable attribute, resistance to damage from one or more sources (e.g., when struck by iron, acid, and/or other substances or weapons), absorption of energy from one or more sources (e.g., healing when struck by wooden weapons rather than being damaged, converting the damage of a fireball into increased magical energy, and/or other absorptions of energy), increased speed, generation of one or more player or system controlled copies of the original player controlled character, the ability to know some to all of the history of an object in the character's possession or awareness (e.g., psychometry), the ability to control objects not in the character's possession (e.g., telekinesis or force field generation), animation and/or control of normally inanimate objects, the ability to transmute objects of one material into another (e.g., metal into wood, iron into water, and/or other transmutations), the ability to generate and/or control visual/auditory/olfactory/kinetic illusions, the ability to change the size and/or shape of the character or other characters or objects, the ability to manipulate temperature of one or more objects or within one or more areas, the ability to manipulate sound (e.g., suppressing or amplifying it), the ability to control or manipulate electric, gravitic and/or magnetic energies/fields, the ability to manipulate light and/or shadow, the ability to manipulate the skills and/or abilities and/or other attributes of one or more other characters (e.g., reducing strength to cause weakness or stealing health from another character to increase one's own).

The benefits may include new perceptions and/or perceptive abilities such as sound-based vision (e.g., echolocation or sonar) and/or vision using frequencies of light beyond those initially perceptible to all characters; ultra- and/or infrasonic hearing; a 'danger' sense notifying the player of potential enemies, traps and/or pitfalls within some specified range; a 'life' sense enabling the player to monitor all characters and/or creatures within a specified range; an ability to detect material of one or more types (e.g., metal, stone, water, or more specifically, gold, iron, granite, ivory and/or others) within a specified range; a mechanic sense providing the player awareness of machines within a specified range; senses able to perceive beyond and/or through what are obstacles to other characters, such as the ability to see objects enclosed within an opaque container, or beyond normal limitations such as size, enabling microscopic and/or telescopic vision; and/or other perceptive abilities.

Other benefits are contemplated.

The benefit criteria associated with a given commitment may define a benefit that is a one-time benefit, or an ongoing benefit. A one-time benefit may be a benefit that is awarded one time to a player accepting the given commitment. An ongoing benefit may be a benefit that is provided to the player over time in an ongoing manner. Ongoing should not be mistaken for continuous. Ongoing benefits may include benefits provided to the player at intervals. An ongoing benefit may be dynamic, static, and/or some other type of ongoing benefit. A static benefit may remain the same for a player accepting the given commitment for as long as the commitment remains in place. A dynamic benefit may change for a player accepting the given commitment over time. For example, the dynamic benefit may increase or decrease over time. The increase or decrease of the dynamic benefit may be defined by the benefit criteria as a function of time for which the given commitment has been accepted, as a function of times the player has performed the actions required by the activity criteria of the given commitment, as a function of the number of time windows that have occurred for the given commitment, and/or as a function of other parameters.

The penalty criteria associated with the commitments define one or more penalties for failing to fulfill accepted commitments. A failure to fulfill a commitment may occur if a player that has accepted a commitment fails to complete the actions required by the activity criteria associated with the commitment during a time window designated by the temporal criteria associated with the commitment. The penalties may include reductions, caps, reduced ability to increase, and/or other penalties in character metrics such as one or more of manna, gold (or other currency), skill or ability metrics, friendship or trustworthiness metrics, and/or other character metrids. The penalties may include loss of virtual objects and/or an ability to use virtual objects within the virtual space. The virtual objects may include one or more of wearable objects (e.g., rare, with abilities, protective, and/or other having other characteristics), tools, weapons, pets, vehicles, mounts, and/or other objects. The penalties may include enmities within the videogame. The enmities may inhibit or prohibit the players from accessing areas of the virtual space, cause enhanced resistance during battle, inhibit or prohibit trade, and/or other penalties. The enmities may be with non-player characters and/or player controlled characters. The penalties may include inhibiting and/or prohibiting access to and/or control over places within the virtual space. Other penalties are contemplated.

The penalty criteria associated with a given commitment may define a penalty that is a one-time penalty, or an ongoing penalty. A one-time penalty may be a penalty that is assessed one time to a player failing to fulfill the given commitment. An ongoing penalty may be a penalty that is assessed to the player over time in an ongoing manner. Ongoing should not be mistaken for continuous. Ongoing penalties may include penalties assessed to the player at intervals. Penalties may be dynamic, static, and/or some other type of penalty. A static penalty may remain the same for a player failing to fulfill the given commitment no matter what has transpired since the player accepted the given commitment. A dynamic penalty may change for a player failing to fulfill the given commitment based on time and/or events that have transpired since acceptance of the given commitment. For example, the dynamic penalty may increase or decrease over time. The increase or decrease of the dynamic penalty may be defined by the benefit criteria as a function of time between acceptance of the given commitment and failure to fulfill the given commitment, as a function of times the player has performed the actions required by the activity criteria of the given commitment prior to the failure to fulfill the given commitment, as a function of the number of time windows that have occurred for the given commitment prior to the failure to fulfill the given commitment, and/or as a function of other parameters.

The commitment module may be configured such that the commitment criteria of one or more of the commitments is preconfigured with the videogame (e.g., by a creator of the videogame). The commitment module may be configured such that for at least one such commitment some or all of the commitment criteria may be adjusted by a player. For example, one or more of benefit criteria, penalty criteria, temporal criteria and/or other criteria may be adjusted by a player. The commitment module may be configured such that a player can create a commitment. The player may create the commitment by specifying some or all of the commitment criteria defining the commitment.

The invitation module may be configured to generate commitment invitations that may be presented to players. The commitment invitations may invite the players to accept commitments. A given commitment invitation may include some or all of the commitment criteria associated with the commitment corresponding to the given commitment invitation. The invitation module may be configured such that the commitment invitations are provided to players within the videogame and/or outside of the videogame.

The invitation module may be configured to receive responses to the commitment invitations from the players. The responses may include acceptances and/or rejections of the commitments corresponding to the commitment invitations.

In some implementations, a commitment invitation may enable a player to adjust and/or select commitment criteria for the commitment. For example, a given commitment may have some criteria that can be specified by players from among a plurality of options. For example, activity criteria options may be included in a commitment invitation that enable a player to select, prior to accepting the commitment, one or more actions to be associated with the given commitment from among a plurality of options. As another example, benefit criteria options may be included in a commitment invitation that enable a player to select, prior to accepting the commitment, one or more benefits to be associated with the given commitment from among a plurality of options. As yet another example, penalty criteria options may be included in a commitment invitation that enable a player to select, prior to accepting the commitment, one or more penalties to be associated with the given commitment from among a plurality of options.

Selectable or configurable commitment criteria may be related such that selection or configuration of one aspect of the commitment criteria may impact another aspect of the commitment criteria. For example, if a player selects a relatively easy action, a relatively long time window to accomplish a prescriptive commitment, and/or a relatively short time window to adhere to a proscriptive commitment, the benefit associated with the commitment may be reduced. Other examples will be apparent.

The benefit module may be configured such that, responsive to a player accepting a commitment, the benefit corresponding to the commitment is provided to the player within the videogame. The benefit provided to the player may be based on the benefit criteria of the accepted commitment. If the benefit is a dynamic benefit, benefit module 28 may determine the benefit to be provided to the player in an ongoing manner.

The performance monitoring module may be configured to monitor the actions of players within the videogame. This may include generating, tagging, labeling, identifying, and/or otherwise monitoring certain actions (e.g., actions specified by activity criteria). Monitoring actions of players with in the videogame may include determining metrics that quantify player performance within the videogame. The performance monitoring module may monitor actions of players without regard for the commitments they have accepted and/or the performance monitoring module may only monitor actions of players related to the commitments they have accepted.

The timing module may be configured to determine if time windows associated with commitments are open. This may included determining time windows that are open based on temporal criteria associated with the commitments. For temporal criteria that trigger the commencement and/or conclusion of timing windows based on circumstances within the videogame, the timing module may be configured to monitor circumstances within the videogame to trigger the commencement and/or conclusion of timing windows.

The performance evaluation module may be configured to determine whether actions of players within the videogame satisfy the activity criteria associated with the commitments they have accepted. For example, responsive to a player accepting a commitment, and responsive to a time window designated by temporal criteria associated with the accepted commitment being open, the performance evaluation module may be configured to compare the actions of the player within the videogame (as monitored by the performance monitoring module) with the actions defined by activity criteria associated with the accepted commitment. Responsive to the actions of the player not fulfilling the requirements of the activity criteria within the time window, the performance evaluation module may determine that the player has failed to fulfill the commitment.

The penalty module may be configured such that, responsive to the performance evaluation module determining that a player has failed to fulfill an accepted commitment, a penalty may be assessed to the player. The penalty may be defined by penalty criteria associated with the failed commitment. If the penalty criteria define a dynamic penalty, the penalty module may be configured to determine the penalty prior to assessment.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
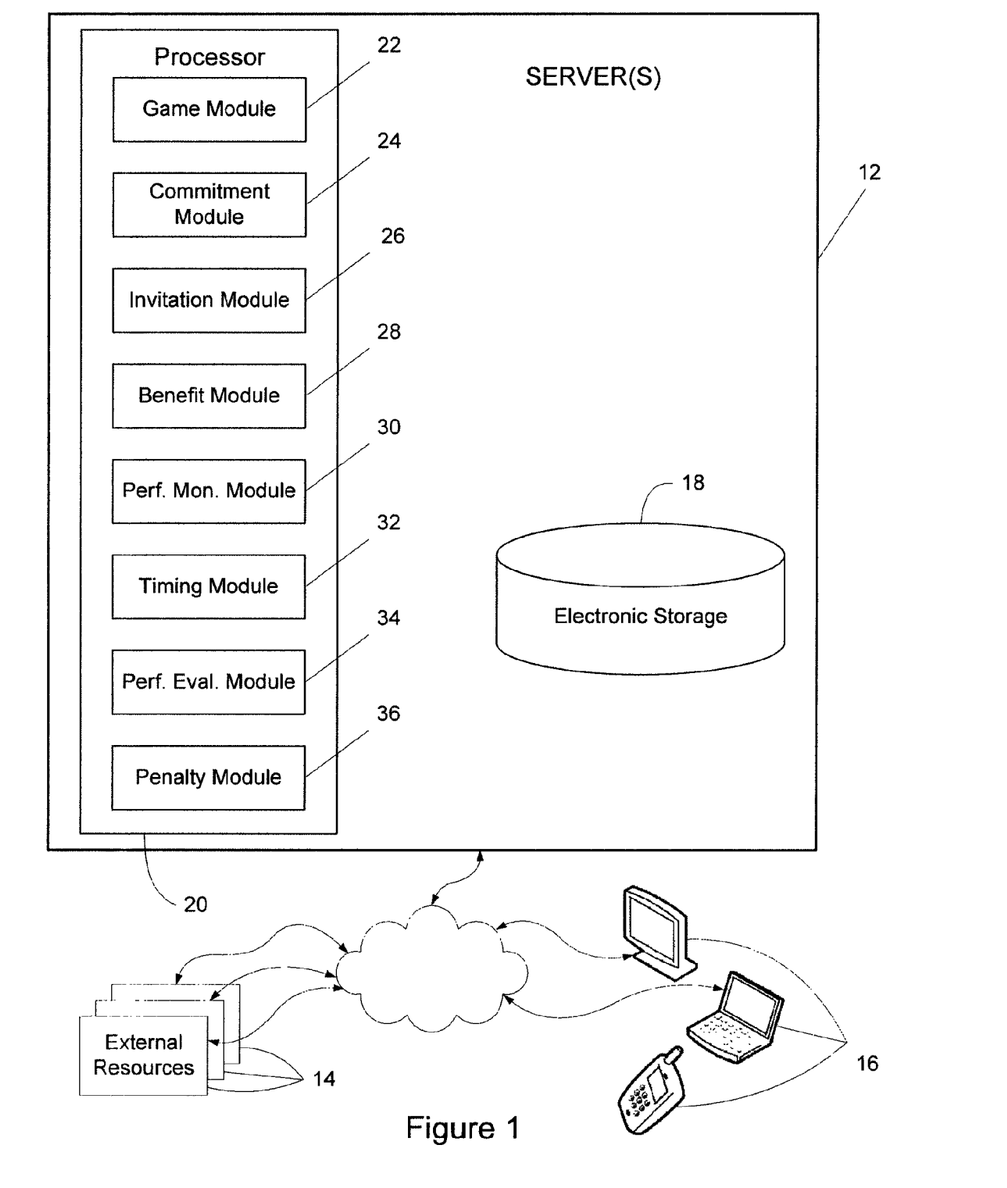
FIG. 1 illustrates a system configured to present optional commitments to players within a videogame, according to one or more embodiments of the invention.

FIG. 1 illustrates a system 10 configured to present optional commitments to players within a videogame. The optional commitments commit players to perform and/or abstain from certain actions within the videogame. The players may be rewarded for accepting commitments. The players may be penalized for failing to fulfill commitments. This model for rewarding optional behaviors may provide an alternative for incenting actions within a videogame to conventional models in which players are rewarded and/or penalized after attempting an activity or activities. The presentation and analysis of optional commitments provided by system 10 may enhance the sense of presence experienced by the players, the relationships and/or cooperation between players, and/or provide other enhancements within the videogame.

In some implementations, system 10 may include one or more servers 12, and/or other components. The system 10 may operate in communication and/or coordination with one or more external resources 14. Users may interface with system 10 and/or external resources 14 via client computing platforms 16. The components of system 10, servers 12, external resources 14, and/or client computing platforms 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, external resources 14, and/or client computing platforms 16 may be operatively linked via some other communication media.

A given client computing platform 16 may include one or more processors configured to execute computer program modules. The computer program modules may be configured to enable one or more users associated with the given client computing platform 16 to interface with system 10 and/or external resources 14, and/or provide other functionality attributed herein to client computing platforms 16. By way of non-limiting example, the given client computing platform 16 may include one or more of a desktop computer, a laptop computer, a handheld computer, a NetBook, a Smartphone, a gaming console, and/or other computing platforms.

The external resources 14 may include sources of information, hosts and/or providers of virtual environments outside of system 10, external entities participating with system 10, and/or other resources. In some implementations, some or all of the functionality attributed herein to external resources 14 may be provided by resources included in system 10.

The servers 12 may be configured to provide, or cooperate with client computing platforms 16, to provide a videogame to players. This may include hosting, serving, and/or otherwise providing a virtual space to the players within which the videogame is played the asynchronous environment to the players via client computing platforms 16. The servers 12 may include electronic storage 18, one or more processors 20, and/or other components. The servers 12 may include communication lines, or ports to enable the exchange of information with a network and/or other computing platforms.

Electronic storage 18 may comprise electronic storage media that electronically stores information. The electronic storage media of electronic storage 18 may include one or both of system storage that is provided integrally (i.e., substantially non-removable) with servers 12 and/or removable storage that is removably connectable to servers 12 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 18 may store software algorithms, information determined by processor 20, information received from servers 12, information received from client computing platforms 16, and/or other information that enables servers 12 to function properly.

Processor(s) 20 is configured to provide information processing capabilities in servers 12. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination.

As is shown in FIG. 1, processor 20 may be configured to execute one or more computer program modules. The one or more computer program modules may include one or more of a game module 22, a commitment module 24, an invitation module 26, a benefit module 28, a performance monitoring module 30, a timing module 32, a performance evaluation module 34, a penalty module 36, and/or other modules. Processor 20 may be configured to execute modules 22, 24, 26, 28, 30, 32, 34, and/or 36 by software; hardware; firmware; some combination of software, hardware, and/or firmware; and/or other mechanisms for configuring processing capabilities on processor 20.

It should be appreciated that although modules 22, 24, 26, 28, 30, 32, 34, and/or 36 are illustrated in FIG. 1 as being co-located within a single processing unit, in implementations in which processor 20 includes multiple processing units, one or more of modules 22, 24, 26, 28, 30, 32, 34, and/or 36 may be located remotely from the other modules. The description of the functionality provided by the different modules 22, 24, 26, 28, 30, 32, 34, and/or 36 described below is for illustrative purposes, and is not intended to be limiting, as any of modules 22, 24, 26, 28, 30, 32, 34, and/or 36 may provide more or less functionality than is described. For example, one or more of modules 22, 24, 26, 28, 30, 32, 34, and/or 36 may be eliminated, and some or all of its functionality may be provided by other ones of modules 22, 24, 26, 28, 30, 32, 34, and/or 36. As another example, processor 20 may be configured to execute one or more additional modules that may perform some or all of the functionality attributed below to one of modules 22, 24, 26, 28, 30, 32, 34, and/or 36.

The game module 22 may be configured to provide the videogame to players via client computing platforms 16. The videogame may take place within a virtual space. The virtual space may be hosted, served, and/or otherwise provided by game module 22. To provide the videogame to players via client computing platform 16, game module 22 and/or client computing platform 16 may generate views of the videogame (and/or the virtual space) that enable players to participate in the videogame.

A virtual space may comprise a simulated space (e.g., a physical space) that is accessible by a client (e.g., client computing platforms 16) that presents a view of the virtual space to a player. The simulated space may have a topography, express ongoing real-time interaction by the player, and/or include one or more objects positioned within the topography that are capable of locomotion within the topography. In some instances, the topography may be a 2-dimensional topography. In other instances, the topography may be a 3-dimensional topography. The topography may include dimensions of the virtual space, and/or surface features of a surface or objects that are "native" to the virtual space. In some instances, the topography may describe a surface (e.g., a ground surface) that runs through at least a substantial portion of the virtual space. In some instances, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.).

Within a virtual space provided by virtual environment servers 12, avatars associated with the players may be controlled by the players to interact with the virtual space. As used herein, the term "avatar" may refer to an object (or group of objects) present in the virtual space that represents an individual player. The avatar may be controlled by the player with which it is associated. The avatars may move through and interact with the virtual space (e.g., non-player and/or player characters in the virtual space, and/or other objects in the virtual space). The avatar associated with a given player may be created and/or customized by the given player. The avatar may be associated with an "inventory" of virtual goods and/or currency that the player can use (e.g., by manipulation of the avatar and/or the items, and/or through the controls presented by the player interface) within the virtual space.

The players may participate in the videogame by controlling an object or objects (e.g., an avatar and/or objects associated with the avatar, a vehicle, and/or other objects) in the virtual space. Control may be exercised through control inputs and/or commands input by the players through client computing platforms 16.

The virtual space may be synchronous and/or asynchronous. While participating in the videogame within an asynchronous virtual space, a player may receive relatively little, if any, real-time or near real-time information about the actions of other players within the virtual space. By contrast, while participating in the videogame within a synchronous virtual space, a player may be able to view the actions of other players within the virtual space in real-time and/or near real-time, and/or to interact with the other players.

The provision of the virtual space to the players by game module 22 may be accomplished in cooperation with a client application that is executed on client computing platforms 16. The client application may be a "fat" client, a "thin" client, and/or other types of client applications.

The client executed on client computing platforms 16 may provide a relatively large amount of the processing cost associated with determining, assembling, and/or presenting views of the virtual space to the player. For example, the client may create an instance of the virtual space locally on the client computing platforms 16. The client executing on one of client computing platforms 16 may display views of the virtual space that are obtained form the local instance of the virtual space. The client may provide information to game module 22 related to the interactions of the player with the instance of the virtual space executed on the client computing platform 16. The client may receive instructions or commands from game module 22 regarding interactions of the virtual space directed toward the player.

The client executed on client computing platforms 16 may provide a relatively small amount of the processing associated with presenting the virtual space to the player. For example, the game module 22 may create one or more instances of the virtual environment on servers 12 for the individual players. Information related to an instance of the virtual environment on servers 12, and/or view information describing views of the instance may then be transmitted by game module 22 from servers 12 to client computing platforms 16, where the corresponding views may be assembled from the received information and presented to the players by the client.

The commitment module 24 may be configured to manage commitment criteria associated with commitments to be provided to players within the videogame. This may include managing sets of commitment criteria associated with individual commitments. The sets of commitment criteria and/or the commitments may be stored in electronic storage 18. The set of commitment criteria associated with a given commitment may include one or more of a name, activity criteria, temporal criteria, benefit criteria, penalty criteria, and/or other criteria.

The activity criteria associated with a commitment may define one or more actions within the videogame. For example, the actions may include traveling to one or more specific locations within the virtual space, fighting (generally or a specified opponent or opponent class), praying, training, trading, crafting, fishing, protecting an object and/or place in the virtual space, wearing or carrying (by virtue of a controlled avatar wearing or carrying) an icon, emblem, token, and/or other object, and/or other actions.

The activity criteria associated with the commitment may indicate whether an action is to be performed and/or abstained from to satisfy the commitment. Commitments for which the activity criteria only define actions to be performed may be referred to as prescriptive commitments. Commitments for which the activity criteria only define actions to be abstained from may be referred to as proscriptive commitments.

The temporal criteria associated with a commitment may designate a time window or windows during which actions defined by the activity are to be performed and/or abstained from in order to fulfill the commitment. The temporal criteria may designate, for example, one or more of a commencement of a time window, a duration of a time window, a conclusion of a time window, and/or other parameters of the time window.

A commitment may be a recurring commitment, a non-recurring commitment, and/or other types of commitments. A recurring commitment may be a commitment having temporal criteria that designate a plurality of time windows that occur again and again within the videogame in a recurring manner. A recurring commitment may still end at some point (e.g., at the occurrence of some event that ends the commitment) after a plurality of time windows have occurred. A non-recurring commitment may be a commitment having temporal criteria that designate a single time window.

In designating the commencement of a time window for a commitment, temporal criteria may designate game circumstances that trigger commencement of the time window. The circumstances may include actions performed by the player accepting the commitment, actions performed by other players, actions performed by non-player characters, events in the virtual space, and/or other circumstances in the game. For example, a player may accept a commitment to aid a specific character (or set of characters) in the videogame whenever they give some predetermined signal for help. The generation of the predetermined signal for help would trigger the commencement of the time window for this commitment. As another example, a player may accept a commitment to engage in battle and/or defeat a specific character (or set of characters) in the videogame whenever the player encounters the specific character. Encounters of the accepting player with the specific character would trigger commencement of the time window for this commitment. As yet another example, a player may accept a commitment to wear an emblem of, for example, a deity, group, or celebrity within the videogame. If the emblem (and/or the object bearing the emblem) is lost or destroyed, a time window may be triggered during which the player must find a replacement. These examples are not intended to be limiting, and other circumstances within the videogame that trigger time windows are contemplated.

In designating the commencement of a time window for a commitment, temporal criteria may designate a frequency at which time windows for the commitment are commenced. As an example, a player may accept a commitment to perform some specified action (or set of actions) every day, week, fortnight, month, and/or other time period. By way of example, the specified action may include practicing a skill, engaging and/or defeating a specified character (or set of characters), visiting a location within the virtual space, visiting a specified character (or set of characters), and/or other actions.

In designating the commencement of a time window for a commitment, temporal criteria may designate the time of acceptance as the commencement for the time window. For example, a player may accept a commitment to never attack and/or harm a specific character and/or set of characters. The temporal criteria may designate the moment of acceptance (and/or a time after some predetermined delay) as the commencement of the time window for the commitment.

In designating the duration of a time window for a commitment, temporal criteria may designate a length of time for which the time window may extend. The length of time may be a fixed amount of time or a variable amount of time. As an example of a variable amount of time, a player may accept a commitment that involves defeating all of a certain type of character within some distance during the time window. The temporal criteria may include a function that determines the duration of the time window as a function of the number and/or strength of the characters during a given time window.

In designating the conclusion of a time window for a commitment, temporal criteria may designate game circumstances that trigger conclusion of the time window. By way of example, a player may accept a commitment that involves defending a certain character (or set of characters) whenever aid is requested by the character. A time window associated with this commitment may end when the character being defended is no longer in danger (e.g., the attackers have been defeated, the attackers have been outrun and/or avoided, the attackers have retreated, and/or other circumstance in which the character is no longer in danger). As another non-limiting example, a player may accept a commitment to be an ally of a specific character (or set of characters). If the specific character becomes withdrawn from the videogame (e.g., by death, by "travel", and/or other circumstances), the player may no longer be committed to being an ally of the specific character. Similarly, if the specific character betrays the player that accepted the invitation and/or performs some other untoward action, the temporal criteria for the commitment may designate that the time window should be concluded.

It will be apparent that the temporal criteria for a given commitment may not include all of a commencement of a time window, a duration of a time window, and a conclusion of a time window. For example, the temporal criteria for the given commitment may designate a duration of a time window and not a conclusion of a time window, or vice versa.

The benefit criteria associated with the commitments define one or more benefits within the videogame to be received by players for accepting commitments. The benefits may include bonuses in character metrics such as one or more of manna, gold (or other currency), skill or ability metrics, friendship or trustworthiness metrics, and/or other character metrics. The benefits may include virtual objects provided to the player within the virtual space. The virtual objects may be wearable, bearable, storable, tradable, sellable, transferrable, destroyable, usable, inhabitable, ridable, and/or disposable. The virtual objects may include one or more of a rare object, an object with abilities, a protective object, a tool, a weapon, a pet, a vehicle, a mount, and/or other objects.

The benefits may include alliances within the videogame. The alliances may provide the players with access to areas of the virtual space, aid during battle, connections for trade, and/or other benefits. The alliances may be with non-player characters and/or player controlled characters. The benefits may include access to and/or control over places within the virtual space.

The benefits may include new skills and/or abilities such as climbing, swimming, flight, breathing underwater, passing through tangible obstructions (e.g., objects, walls, creatures, and/or other obstructions), partial to complete camouflage and/or invisibility, stealthy activities (e.g., hiding, moving silently, moving in shadow, and/or other activities), accelerated healing, rapid recovery of strength and/or any other recoverable attribute, resistance to damage from one or more sources (e.g., when struck by iron, acid, and/or other substances or weapons), absorption of energy from one or more sources (e.g., healing when struck by wooden weapons rather than being damaged, converting the damage of a fireball into increased magical energy, and/or other absorptions of energy), increased speed, generation of one or more player or system controlled copies of the original player controlled character, the ability to know some to all of the history of an object in the character's possession or awareness (e.g., psychometry), the ability to control objects not in the character's possession (e.g., telekinesis or force field generation), animation and/or control of normally inanimate objects, the ability to transmute objects of one material into another (e.g., metal into wood, iron into water, and/or other transmutations), the ability to generate and/or control visual/auditory/olfactory/kinetic illusions, the ability to change the size and/or shape of the character or other characters or objects, the ability to manipulate temperature of one or more objects or within one or more areas, the ability to manipulate sound (e.g., suppressing or amplifying it), the ability to control or manipulate electric, gravitic and/or magnetic energies/fields, the ability to manipulate light and/or shadow, the ability to manipulate the skills and/or abilities and/or other attributes of one or more other characters (e.g., reducing strength to cause weakness or stealing health from another character to increase one's own).

The benefits may include new perceptions and/or perceptive abilities such as sound-based vision (e.g., echolocation or sonar) and/or vision using frequencies of light beyond those initially perceptible to all characters; ultra- and/or infrasonic hearing; a 'danger' sense notifying the player of potential enemies, traps and/or pitfalls within some specified range; a 'life' sense enabling the player to monitor all characters and/or creatures within a specified range; an ability to detect material of one or more types (e.g., metal, stone, water, or more specifically, gold, iron, granite, ivory and/or others) within a specified range; a mechanic sense providing the player awareness of machines within a specified range; senses able to perceive beyond and/or through what are obstacles to other characters, such as the ability to see objects enclosed within an opaque container, or beyond normal limitations such as size, enabling microscopic and/or telescopic vision; and/or other perceptive abilities.

Other benefits are contemplated.

The benefit criteria associated with a given commitment may define a benefit that is a one-time benefit, or an ongoing benefit. A one-time benefit may be a benefit that is awarded one time to a player accepting the given commitment. An ongoing benefit may be a benefit that is provided to the player over time in an ongoing manner. Ongoing should not be mistaken for continuous. Ongoing benefits may include benefits provided to the player at intervals. An ongoing benefit may be dynamic, static, and/or some other type of ongoing benefit. A static benefit may remain the same for a player accepting the given commitment for as long as the commitment remains in place. A dynamic benefit may change for a player accepting the given commitment over time. For example, the dynamic benefit may increase or decrease over time. The increase or decrease of the dynamic benefit may be defined by the benefit criteria as a function of time for which the given commitment has been accepted, as a function of times the player has performed the actions required by the activity criteria of the given commitment, as a function of the number of time windows that have occurred for the given commitment, and/or as a function of other parameters.

The penalty criteria associated with the commitments define one or more penalties for failing to fulfill accepted commitments. A failure to fulfill a commitment may occur if a player that has accepted a commitment fails to complete the actions required by the activity criteria associated with the commitment during a time window designated by the temporal criteria associated with the commitment. The penalties may include reductions, caps, reduced ability to increase, and/or other penalties in character metrics such as one or more of manna, gold (or other currency), skill or ability metrics, friendship or trustworthiness metrics, and/or other character metrics. The penalties may include loss of virtual objects and/or an ability to use virtual objects within the virtual space. The virtual objects may include one or more of wearable objects (e.g., rare, with abilities, protective, and/or other having other characteristics), tools, weapons, pets, vehicles, mounts, and/or other objects. The penalties may include enmities within the videogame. The enmities may inhibit or prohibit the players from accessing areas of the virtual space, cause enhanced resistance during battle, inhibit or prohibit trade, and/or other penalties. The enmities may be with non-player characters and/or player controlled characters. The penalties may include inhibiting and/or prohibiting access to and/or control over places within the virtual space. Other penalties are contemplated.

The penalty criteria associated with a given commitment may define a penalty that is a one-time penalty, or an ongoing penalty. A one-time penalty may be a penalty that is assessed one time to a player failing to fulfill the given commitment. An ongoing penalty may be a penalty that is assessed to the player over time in an ongoing manner. Ongoing should not be mistaken for continuous. Ongoing penalties may include penalties assessed to the player at intervals. Penalties may be dynamic, static, and/or some other type of penalty. A static penalty may remain the same for a player failing to fulfill the given commitment no matter what has transpired since the player accepted the given commitment. A dynamic penalty may change for a player failing to fulfill the given commitment based on time and/or events that have transpired since acceptance of the given commitment. For example, the dynamic penalty may increase or decrease over time. The increase or decrease of the dynamic penalty may be defined by the benefit criteria as a function of time between acceptance of the given commitment and failure to fulfill the given commitment, as a function of times the player has performed the actions required by the activity criteria of the given commitment prior to the failure to fulfill the given commitment, as a function of the number of time windows that have occurred for the given commitment prior to the failure to fulfill the given commitment, and/or as a function of other parameters.

The commitment module 24 may be configured such that the commitment criteria of one or more of the commitments is preconfigured with the videogame (e.g., by a creator of the videogame). The commitment module 24 may be configured such that for at least one such commitment some or all of the commitment criteria may be adjusted by a player. For example, one or more of benefit criteria, penalty criteria, temporal criteria and/or other criteria may be adjusted by a player. The commitment module 24 may be configured such that a player can create a commitment. The player may create the commitment by specifying some or all of the commitment criteria defining the commitment.

The invitation module 26 may be configured to generate commitment invitations that may be presented to players (e.g., via client computing platforms 16). The commitment invitations may invite the players to accept commitments. A given commitment invitation may include some or all of the commitment criteria associated with the commitment corresponding to the given commitment invitation. The invitation module 26 may be configured such that the commitment invitations are provided to players within the videogame and/or outside of the videogame.

The invitation module 26 may be configured to receive responses to the commitment invitations from the players. The responses may include acceptances and/or rejections of the commitments corresponding to the commitment invitations.

In some implementations, a commitment invitation may enable a player to adjust and/or select commitment criteria for the commitment. For example, a given commitment may have some criteria that can be specified by players from among a plurality of options. For example, activity criteria options may be included in a commitment invitation that enable a player to select, prior to accepting the commitment, one or more actions to be associated with the given commitment from among a plurality of options. As another example, benefit criteria options may be included in a commitment invitation that enable a player to select, prior to accepting the commitment, one or more benefits to be associated with the given commitment from among a plurality of options. As yet another example, penalty criteria options may be included in a commitment invitation that enable a player to select, prior to accepting the commitment, one or more penalties to be associated with the given commitment from among a plurality of options.

Selectable or configurable commitment criteria may be related such that selection or configuration of one aspect of the commitment criteria may impact another aspect of the commitment criteria. For example, if a player selects a relatively easy action, a relatively long time window to accomplish a prescriptive commitment, and/or a relatively short time window to adhere to a proscriptive commitment, the benefit associated with the commitment may be reduced. Other examples will be apparent.

Figure 2:
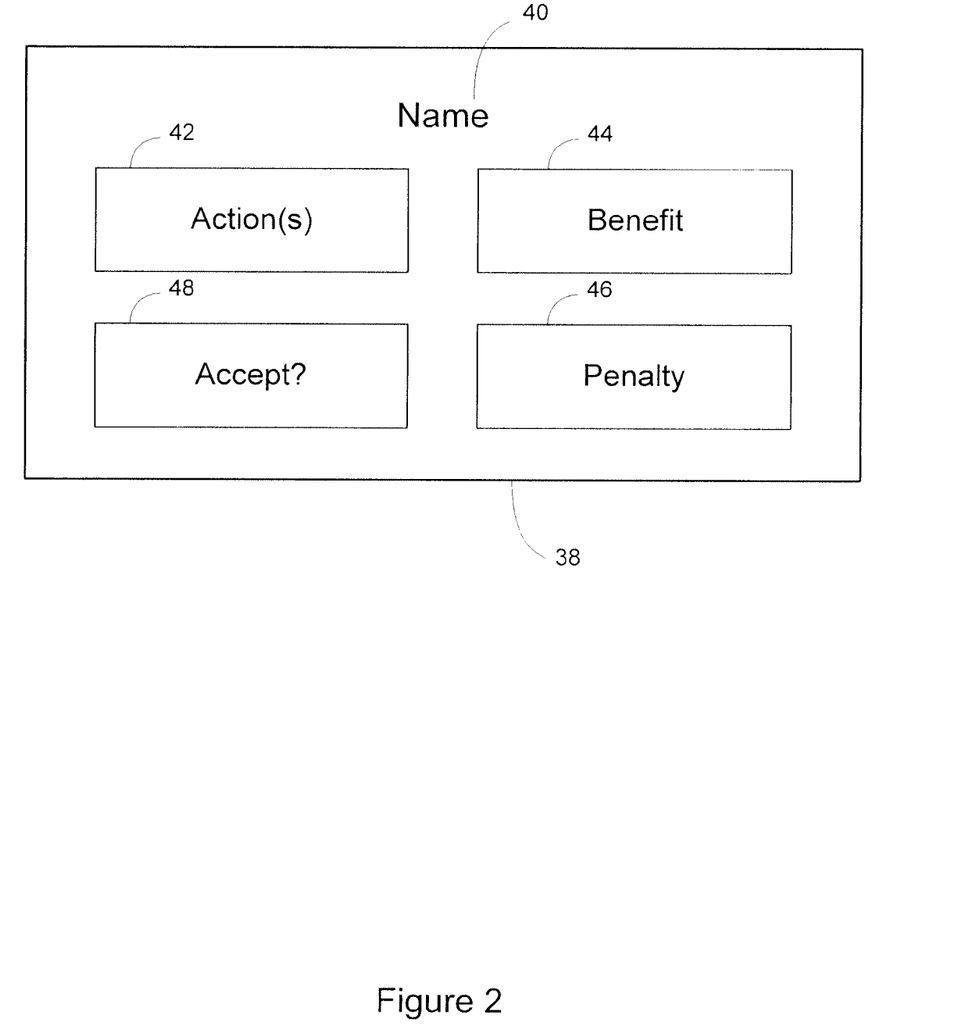
FIG. 2 illustrates a user interface presenting a commitment invitation to a player, in accordance with one or more embodiments of the invention.

FIG. 2 illustrates a user interface 38 presenting a commitment invitation to a player. The user interface 38 may be presented to the player via a client computing platform similar to or the same as client computing platform 16 (shown in FIG. 1 and described herein). The user interface 38 may include one or more of a name field 40, an action field 42, a benefit field 44, a penalty field 46, and/or other fields. The name field 40 may convey a name of the commitment corresponding to the commitment invitation to the player. The action field 42 may inform the player of and/or receive selection or input of actions required to fulfill the commitment. The benefit field 44 may inform the player of and/or receive selection of input of one or more benefits to be received by the player for accepting the commitment. The penalty field 46 may inform the player of and/or receive selection or input of one or more penalties to be assessed for failure to fulfill the commitment. The user interface 38 may be configured to receive acceptance and/or rejection of the commitment from the player at an acceptance field 48. Individual ones of fields 40, 42, 44, 46, and/or 48 may include one or more of text fields selectable buttons, pull-down menus, scrolling menus, and/or other user interface elements configured to receive user selection and/or input.

It will be appreciated that the presentation of commitment criteria to players for selection within commitment invitations is not intended to be limiting. In some implementations, a user interface may be provided to players separate from a commitment invitation that permits players to select and/or configure commitment criteria of commitments that have yet been accepted and/or that have already been accepted.

Returning to FIG. 1, the benefit module 28 may be configured such that, responsive to a player accepting a commitment, the benefit corresponding to the commitment is provided to the player within the videogame. The benefit provided to the player may be based on the benefit criteria of the accepted commitment. If the benefit is a dynamic benefit, benefit module 28 may determine the benefit to be provided to the player in an ongoing manner.

The performance monitoring module 30 may be configured to monitor the actions of players within the videogame. This may include generating, tagging, labeling, identifying, and/or otherwise monitoring certain actions (e.g., actions specified by activity criteria). Monitoring actions of players with in the videogame may include determining metrics that quantify player performance within the videogame. The performance monitoring module 30 may monitor actions of players without regard for the commitments they have accepted and/or performance monitoring module 30 may only monitor actions of players related to the commitments they have accepted. To monitor actions of players within the videogame, performance monitoring module 30 may interact with game module 22.

The timing module 32 may be configured to determine if time windows associated with commitments are open. This may included determining time windows that are open based on temporal criteria associated with the commitments. For temporal criteria that trigger the commencement and/or conclusion of timing windows based on circumstances within the videogame, timing module 32 may be configured to monitor circumstances within the videogame to trigger the commencement and/or conclusion of timing windows.

Figure 3:
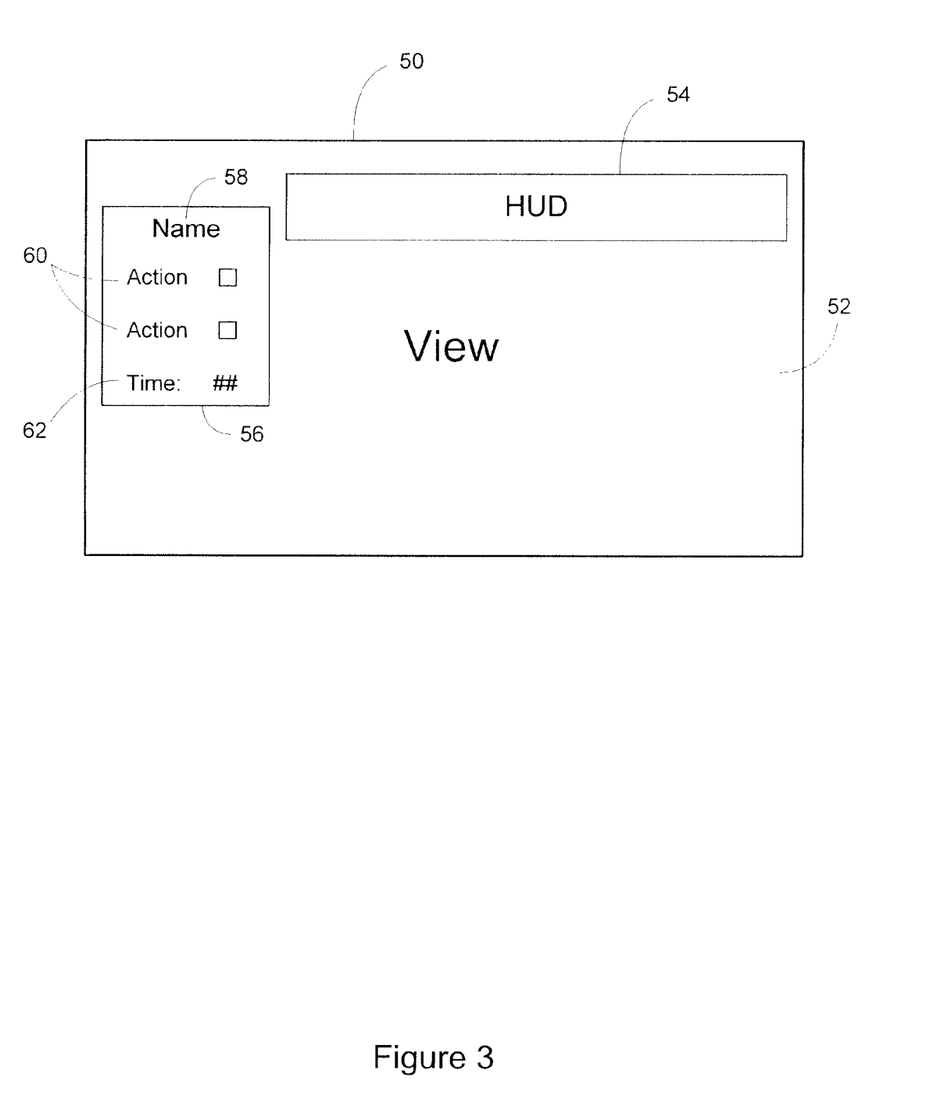
FIG. 3 illustrates a user interface presenting views of a videogame to a player and indicating the status of a commitment, according to one or more embodiments of the invention.

During a time window of a commitment, the view of the virtual space presented to the player may be altered to reflect the requirements imposed on the player by the commitment. For example, FIG. 3 illustrates a user interface 50 including a view 52 of the virtual space, a heads-up display 54, and a commitment alert 56. The user interface 50 may be presented to the player via a client computing platform similar to or the same as client computing platform 16 (shown in FIG. 1 and described herein). The commitment alert 56 may indicate to the player that the time window is open. The commitment alert may include one or more of a name field 58, one or more action fields 60, a timing field 62, and/or other elements. The name field 58 may present to the player the name of the commitment. The action fields 60 may indicate to the player the actions that must be performed and/or abstained from to fulfill the commitment. The action fields 60 may indicate which, if any, of the actions have been performed during the time window. The time field 62 may indicate to the player an amount of time remaining within the time window. The commitment alert 56 may be displayed to the player responsive to commencement of the time window and/or responsive to a received request from the player for its display.

Referring back to FIG. 1, the performance evaluation module 34 may be configured to determine whether actions of players within the videogame satisfy the activity criteria associated with the commitments they have accepted. For example, responsive to a player accepting a commitment, and responsive to a time window designated by temporal criteria associated with the accepted commitment being open, performance evaluation module 34 may be configured to compare the actions of the player within the videogame (as monitored by performance monitoring module 30) with the actions defined by activity criteria associated with the accepted commitment. Responsive to the actions of the player not fulfilling the requirements of the activity criteria within the time window, performance evaluation module 34 may determine that the player has failed to fulfill the commitment.

The penalty module 36 may be configured such that, responsive to performance evaluation module 34 determining that a player has failed to fulfill an accepted commitment, a penalty may be assessed to the player. The penalty may be defined by penalty criteria associated with the failed commitment. If the penalty criteria define a dynamic penalty, penalty module 36 may be configured to determine the penalty prior to assessment.

It will be appreciated that the illustration of processor 20 modules 22, 24, 26, 28, 30, 32, 34, and/or 36 being separate from client computing platforms 16 is not intended to be limiting. For example, in some implementations, the videogame may be provided to a player by a client computing platform 16 executing modules 22, 24, 26, 28, 30, 32, 34, and/or 36 locally. This client computing platform 16 may or may not even be in communication with a server. Similarly, some of modules 22, 24, 26, 28, 30, 32, 34, and/or 36 may be executed locally on client computing platform 16 while others are executed on servers 12, and/or part of the functionality attributed to individual ones of modules 22, 24, 26, 28, 30, 32, 34, and/or 36 may be executed on client computing platform 16.

Figure 4:
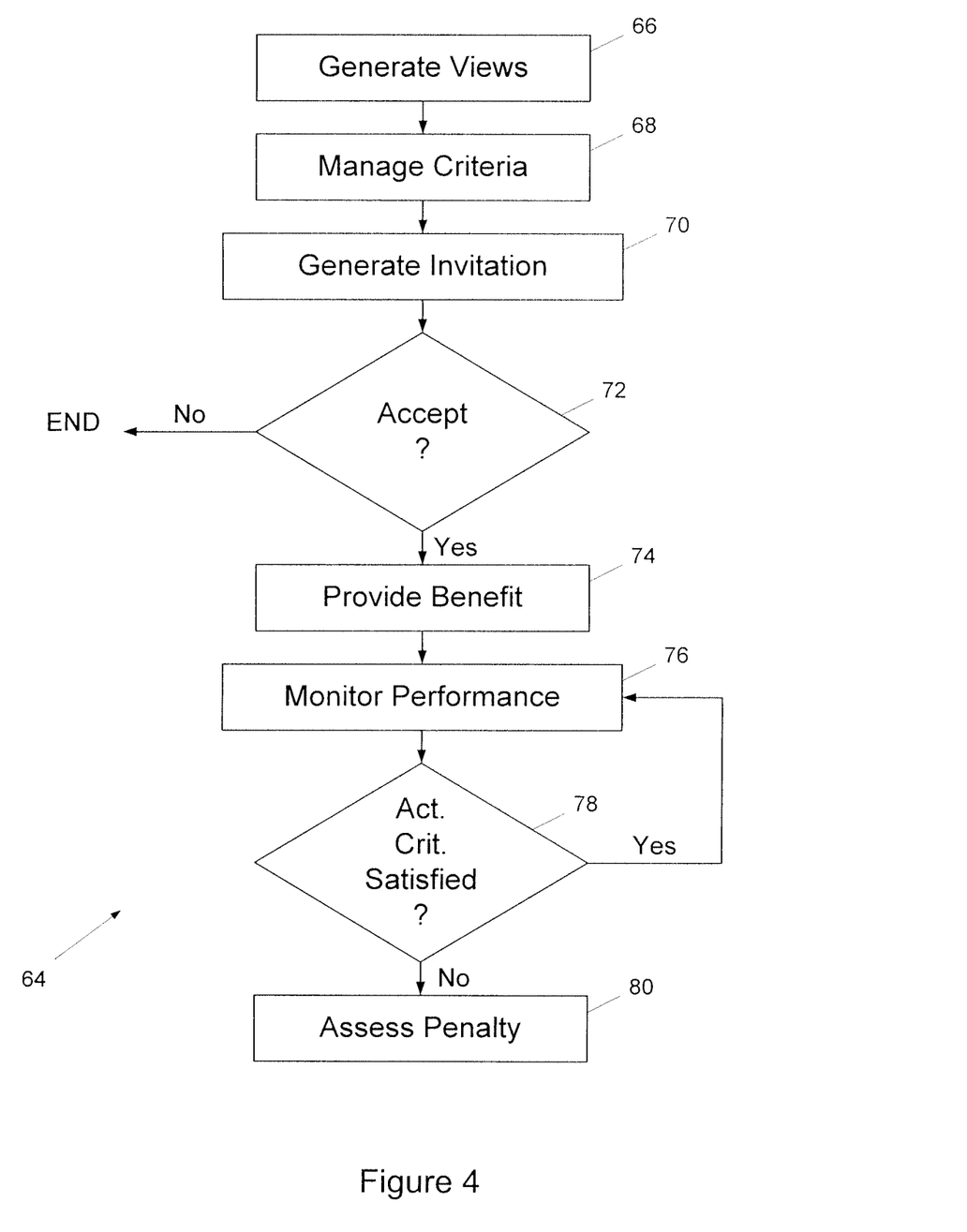
FIG. 4 illustrates a method of providing optional commitments to players within a videogame, in accordance to one or more embodiments of the invention.

FIG. 4 illustrates a method 64 of presenting optional commitments to a player within the context of a videogame. The operations of method 64 presented below are intended to be illustrative. In some embodiments, method 64 may be accomplished with one or more additional operations not described, and/or without one or more of the operations discussed. Additionally, the order in which the operations of method 64 are illustrated in FIG. 4 and described below is not intended to be limiting.

In some embodiments, method 64 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 64 in response to instructions stored electronically on an electronic storage medium. The one or more processing devices may include one or more devices configured through hardware, firmware, and/or software to be specifically designed for execution of one or more of the operations of method 64.

At an operation 66, views of a videogame may be generated. The views of the videogame may be generated for presentation to the player. The views of the videogame may enable the player to participate in the videogame. In some implementations, operation 66 may be performed by a game module the same as or similar to game module 22 (shown in FIG. 1 and described above).

At an operation 68, a set of commitment criteria associated with a commitment in the videogame is stored. The storage, organization, and/or access of the set of commitment criteria may be managed by a commitment module the same as or similar to commitment module 24 (shown in FIG. 1 and described above).

At an operation 70, a commitment invitation corresponding to the commitment may be generated. The commitment invitation may invite the player to accept the commitment. The commitment invitation may convey at least some of the commitment criteria to the player. In some implementations, operation 68 may be performed by an invitation module the same as or similar to invitation module 26 (shown in FIG. 1 and described above).

At an operation 72, a response to the commitment invitation may be received from the player. The response to the commitment invitation may include an acceptance and/or a rejection. If the response includes an acceptance, or if no response is received, method 64 may end. Responsive to receiving a response that includes an acceptance of the commitment, method 64 may proceed to an operation 74. In some implementations, operation 72 may be performed by an invitation module the same as or similar to invitation module 26 (shown in FIG. 1 and described above).

At operation 74, a benefit associated with the commitment may be provided to the player within the videogame. The benefit may be defined by benefit criteria in the set of criteria associated with the commitment. In some implementations, operation 74 may be performed by a benefit module the same as or similar to benefit module 28 (shown in FIG. 1 and described above).

At an operation 76, performance of the player within the videogame may be monitored. In some implementations, operation 76 may be performed by a performance monitoring module the same as or similar to performance monitoring module 30 (shown in FIG. 1 and described above).

At an operation 78, a determination may be made as to whether the actions of the player within the videogame satisfy activity criteria associated with the commitment. If the actions of the player do not satisfy the activity criteria, the player may have failed to fulfill the commitment. Responsive to a determination at operation 78 that the actions of the player satisfy the activity criteria, method 64 may return to operation 76. Responsive to a determination at operation 78 that the player has failed to fulfill the commitment, method 64 may proceed to an operation 80. In some implementations, operation 78 may be performed by a performance evaluation module similar to or the same as performance evaluation module 34 (shown in FIG. 1 and described above).

At operation 80, a penalty may be assessed to the player within the videogame. The penalty may be defined by penalty criteria associated with the commitment. If the penalty is dynamic, operation 80 may include determining the penalty in accordance with the penalty criteria. At operation 80, the commitment may end for the player. This may include a loss or reduction of the benefit received responsive to the player's acceptance of the commitment. The ending of the commitment may trigger a commitment invitation for the same commitment that has been failed to be re-transmitted to the player. This may permit the player to determine whether to enter into the commitment again. The ending of the commitment may trigger a commitment invitation for some other, perhaps related, commitment. In some implementations, operation 80 may not end the commitment and method 64 may return to operation 76 to proceed with determinations as to whether future actions by the player satisfy the commitment.

Figure 5:
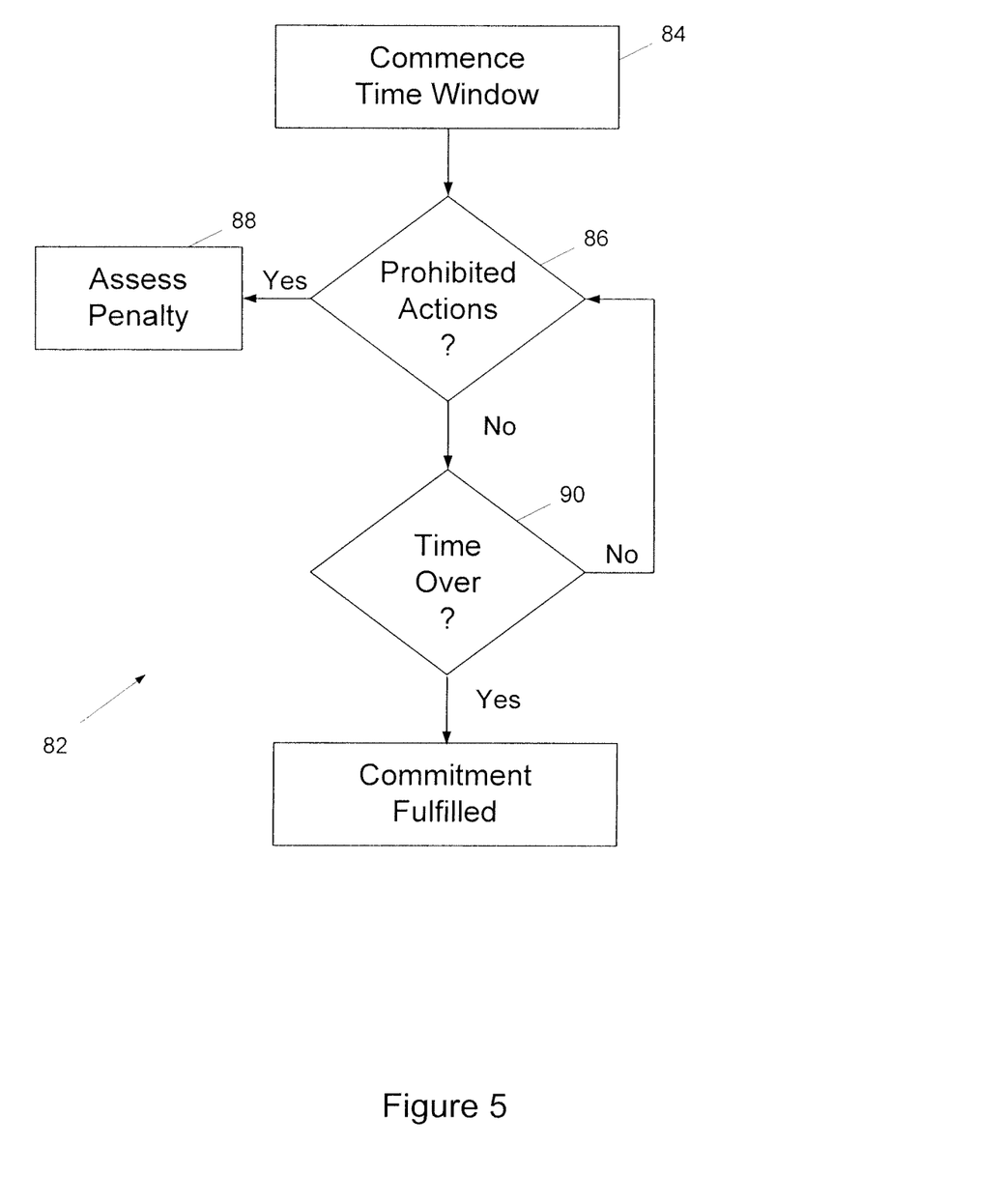
FIG. 5 illustrates a method of determining if a player has fulfilled a commitment within a videogame, according to one or more embodiments of the invention.

FIG. 5 illustrates a method 82 of determining whether a player has failed to fulfill a previously accepted commitment. In particular, the determination may be made with respect to a proscriptive commitment in which the player has committed to abstain from one or more actions defined by action criteria associated with the commitment. The operations of method 82 presented below are intended to be illustrative. In some embodiments, method 82 may be accomplished with one or more additional operations not described, and/or without one or more of the operations discussed. Additionally, the order in which the operations of method 82 are illustrated in FIG. 5 and described below is not intended to be limiting. In some implementations, method 82 may be implemented as operation 78 in method 64 (shown in FIG. 4 and described above).

In some embodiments, method 82 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 82 in response to instructions stored electronically on an electronic storage medium. The one or more processing devices may include one or more devices configured through hardware, firmware, and/or software to be specifically designed for execution of one or more of the operations of method 82.

At an operation 84, a time window corresponding to the commitment may be commenced. The commencement of the time window may be designated by temporal criteria associated with the commitment. The temporal criteria may designate a timing of the commencement, a frequency of commencements for time windows corresponding to the commitment, circumstances in the videogame that trigger commencement, and/or otherwise designate a commencement of the time window. Operation 84 may be performed based on the temporal criteria by a timing module similar to or the same as timing module 32 (shown in FIG. 1 and described above).

At an operation 86, a determination may be made as to whether the player has engaged in the actions prohibited by the commitment. Responsive to a determination that the player has engaged in the action(s) prohibited by the commitment, method 82 may proceed to an operation 88. Responsive to a determination that the player has not engaged in the action(s) prohibited by the commitment, method 82 may proceed to an operation 90. In some implementations, operation 86 may be performed by a performance evaluation module similar to or the same as performance evaluation module 34 (shown in FIG. 1 and described above).

At operation 88, a penalty may be assessed to the player within the videogame. Operation 88 may be similar to or the same as operation 80 (shown in FIG. 4 and described above).

At operation 90, a determination may be made as to whether the time window corresponding to the commitment has concluded. This determination may be made based on the temporal criteria associated with the commitment. For example, the temporal criteria may include a duration for the time window, an ending time for the time window, criteria for determining a duration and/or ending time of the time window, circumstances within the videogame that trigger an ending of the time window, and/or other criteria. Responsive to a determination that the time window has concluded, method 82 may end with a determination that the commitment has been fulfilled. Responsive to a determination that the time window has not concluded, method 82 may return to operation 86 to continue evaluation of the actions of the player in the videogame. In some implementations, operation 90 may be performed by a timing module similar to or the same as timing module 32 (shown in FIG. 1 and described above).

Figure 6:
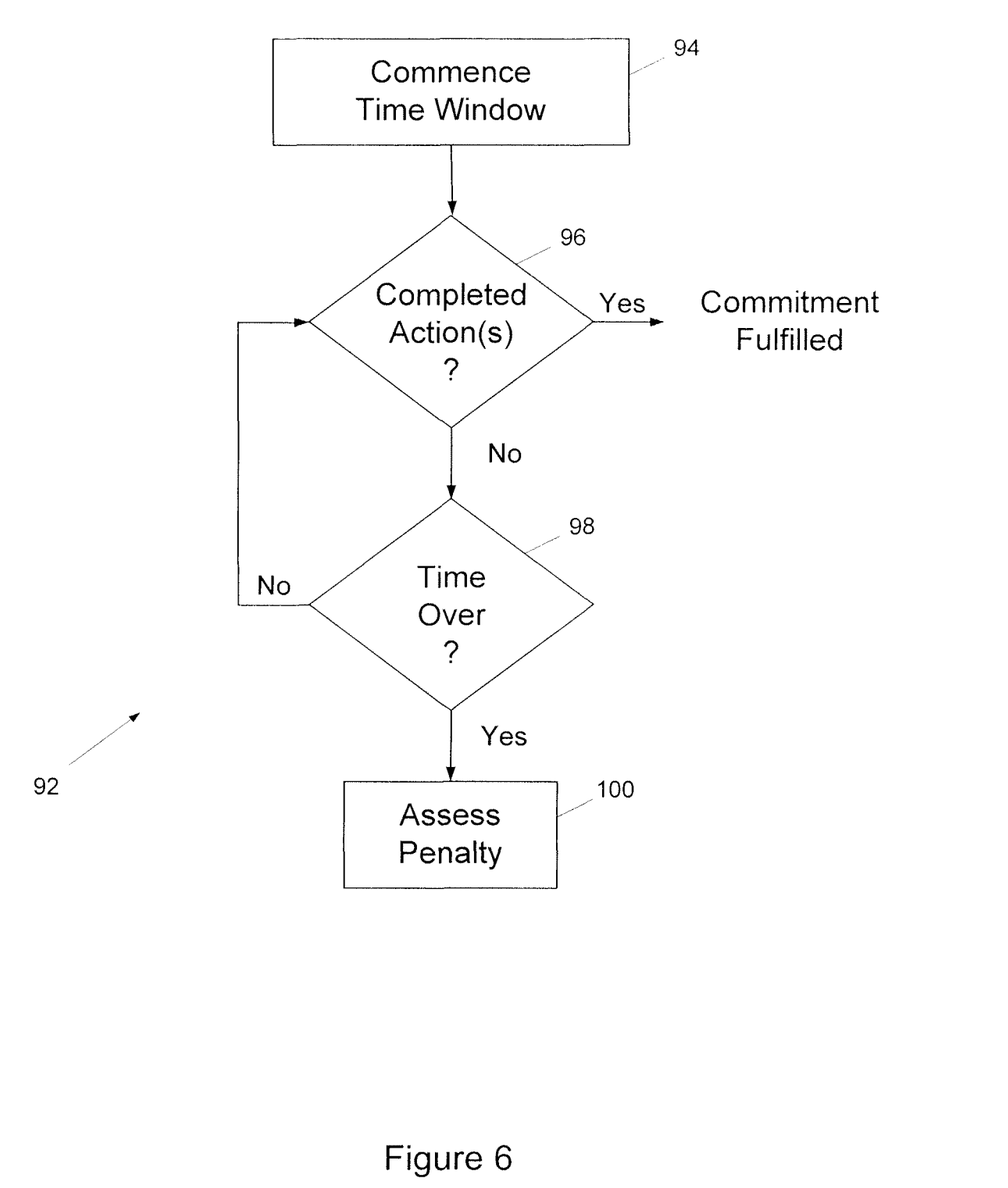
FIG. 6 illustrates a method of determining if a player has fulfilled a commitment within a videogame, according to one or more embodiments of the invention.

FIG. 6 illustrates a method 92 of determining whether a player has failed to fulfill a previously accepted commitment. In particular, the determination may be made with respect to a prescriptive commitment in which the player has committed to perform one or more actions defined by action criteria associated with the commitment. In particular, the commitment criteria of the prescriptive commitment require performance to completion of one or more actions in the videogame during one or more time windows. The operations of method 92 presented below are intended to be illustrative. In some embodiments, method 92 may be accomplished with one or more additional operations not described, and/or without one or more of the operations discussed. Additionally, the order in which the operations of method 92 are illustrated in FIG. 6 and described below is not intended to be limiting. In some implementations, method 92 may be implemented as operation 78 in method 64 (shown in FIG. 4 and described above).

In some embodiments, method 92 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 92 in response to instructions stored electronically on an electronic storage medium. The one or more processing devices may include one or more devices configured through hardware, firmware, and/or software to be specifically designed for execution of one or more of the operations of method 92.

At an operation 94, a time window corresponding to the commitment may be commenced. The commencement of the time window may be designated by temporal criteria associated with the commitment. The temporal criteria may designate a timing of the commencement, a frequency of commencements for time windows corresponding to the commitment, circumstances in the videogame that trigger commencement, and/or otherwise designate a commencement of the time window. Operation 94 may be performed based on the temporal criteria by a timing module similar to or the same as timing module 32 (shown in FIG. 1 and described above).

At an operation 96, a determination may be made as to whether the player has performed the action(s) to completion required by the commitment. Responsive to a determination that the player has not performed the action(s) required by the commitment, method 92 may proceed to an operation 98. Responsive to a determination at operation 96 that the action(s) have been performed to completion, method 92 may end with the determination that the player has satisfied the commitment. In some implementations, operation 96 may be performed by a performance evaluation module similar to or the same as performance evaluation module 34 (shown in FIG. 1 and described above).

At operation 98, a determination may be made as to whether the time window corresponding to the commitment has concluded. This determination may be made based on the temporal criteria associated with the commitment. For example, the temporal criteria may include a duration for the time window, an ending time for the time window, criteria for determining a duration and/or ending time of the time window, circumstances within the videogame that trigger an ending of the time window, and/or other criteria. Responsive to a determination that the time window has concluded, method 92 may proceed to an operation 100. Responsive to a determination that the time window has not concluded, method 82 may return to operation 96 to continue evaluation of the actions of the player in the videogame. In some implementations, operation 98 may be performed by a timing module similar to or the same as timing module 32 (shown in FIG. 1 and described above).

At operation 100, a penalty may be assessed to the player within the videogame. Operation 100 may be similar to or the same as operation 80 (shown in FIG. 4 and described above).

Figure 7:
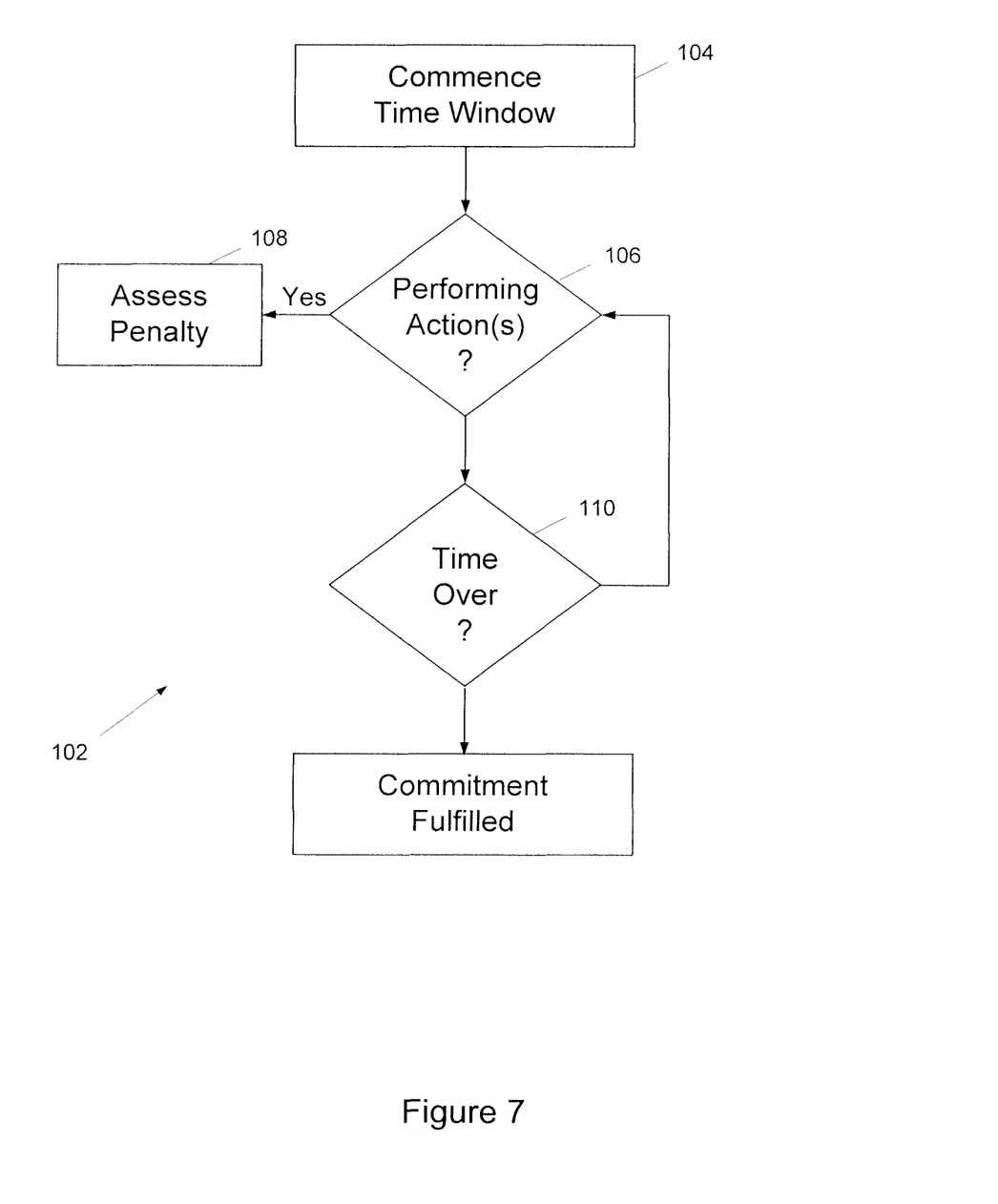
FIG. 7 illustrates a method of determining if a player has fulfilled a commitment within a videogame, according to one or more embodiments of the invention.

FIG. 7 illustrates a method 102 of determining whether a player has failed to fulfill a previously accepted commitment. In particular, the determination may be made with respect to a prescriptive commitment in which the player has committed to perform one or more actions defined by action criteria associated with the commitment. In particular, the commitment criteria of the prescriptive commitment require performance of actions in the videogame for the durations of one or more time windows (e.g., protecting place, character, and/or object). The operations of method 102 presented below are intended to be illustrative. In some embodiments, method 102 may be accomplished with one or more additional operations not described, and/or without one or more of the operations discussed. Additionally, the order in which the operations of method 102 are illustrated in FIG. 7 and described below is not intended to be limiting. In some implementations, method 102 may be implemented as operation 78 in method 64 (shown in FIG. 4 and described above).

In some embodiments, method 102 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 102 in response to instructions stored electronically on an electronic storage medium. The one or more processing devices may include one or more devices configured through hardware, firmware, and/or software to be specifically designed for execution of one or more of the operations of method 102.

At an operation 104, a time window corresponding to the commitment may be commenced. The commencement of the time window may be designated by temporal criteria associated with the commitment. The temporal criteria may designate a timing of the commencement, a frequency of commencements for time windows corresponding to the commitment, circumstances in the videogame that trigger commencement, and/or otherwise designate a commencement of the time window. Operation 104 may be performed based on the temporal criteria by a timing module similar to or the same as timing module 32 (shown in FIG. 1 and described above).

At an operation 106, a determination may be made as to whether the player is performing the action(s) to required by the commitment. Responsive to a determination that the player is not performed the action(s) required by the commitment, method 102 may proceed to an operation 108. Responsive to a determination at operation 106 that the player is performing the action(s), method 102 may proceed to an operation 110. In some implementations, operation 106 may be performed by a performance evaluation module similar to or the same as performance evaluation module 34 (shown in FIG. 1 and described above).

At operation 108, a penalty may be assessed to the player within the videogame. Operation 108 may be similar to or the same as operation 80 (shown in FIG. 4 and described above).

At operation 110, a determination may be made as to whether the time window corresponding to the commitment has concluded. This determination may be made based on the temporal criteria associated with the commitment. For example, the temporal criteria may include a duration for the time window, an ending time for the time window, criteria for determining a duration and/or ending time of the time window, circumstances within the videogame that trigger an ending of the time window, and/or other criteria. Responsive to a determination that the time window has concluded, method 102 may conclude with a determination that the player has fulfilled the commitment for the time window. Responsive to a determination that the time window has not concluded, method 82 may return to operation 106 to continue evaluation of the actions of the player in the videogame. In some implementations, operation 110 may be performed by a timing module similar to or the same as timing module 32 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to present optional commitments to a player within the context of a videogame, the system comprising:
   one or more processors configured to execute computer program modules, the computer program modules comprising:
      a game module configured to generate views of a videogame for presentation to a player that enable the player to participate in the videogame;
      a commitment module configured to manage a set of commitment criteria associated with a commitment, wherein the set of commitment criteria comprises an activity criteria that defines ongoing and/or repeated actions required of a player over time to fulfill the commitment, a benefit criteria, and a penalty criteria;
      an invitation module configured to generate a commitment invitation inviting the player to accept the commitment associated with the set of commitment criteria, the invitation module being further configured to receive a response to the commitment invitation from the player;

a benefit module configured such that, responsive to the player invitation module receiving an acceptance of the commitment invitation from the player, a benefit corresponding to the benefit criteria associated with the commitment is provided to the player within the videogame; and a performance evaluation module configured to determine whether ongoing and/or repeated actions of the player over time within the videogame satisfy the activity criteria associated with the commitment.

2. The system of claim 1, wherein the computer program modules further comprise a penalty module configured such that, responsive to the player invitation module receiving an acceptance of the commitment invitation from the player and responsive to determination by the performance evaluation module that the actions of the player within the videogame do not satisfy the activity criteria, a penalty corresponding to the penalty criteria associated with the commitment is provided to the player within the videogame.

3. The system of claim 1, wherein the computer program modules are configured such that, responsive to the invitation module not receiving an acceptance of the commitment invitation from the player, neither the benefit corresponding to the benefit criteria nor a penalty associated with the commitment are provided to the player within the videogame.

4. The system of claim 1, wherein the invitation module is configured such that the commitment invitation conveys at least some of the commitment criteria to the player.

5. The system of claim 1, wherein the set of criteria further includes temporal criteria designating a time period, and wherein the performance evaluation module is configured to determine whether the activity criteria are satisfied based only on the actions of the player within the videogame during the time period.

6. The system of claim 5, wherein the temporal criteria comprise one or more trigger parameters defining a trigger that triggers a commencement of the time period.

7. The system of claim 6, further comprising a timing module configured to detect the trigger.

8. The system of claim 5, wherein the temporal criteria comprise a duration of the time period.

9. The system of claim 1, wherein the activity criteria define one or more actions to be performed by the player within the videogame.

10. The system of claim 1, wherein the activity criteria define one or more actions to be avoided by the player within the videogame.

11. A computer-implemented method of presenting optional commitments to a player within the context of a videogame, the method being implemented in a computer system comprising one or more processors executing computer program modules, the method comprising:

generating views of a videogame for presentation to a player that enable the player to participate in the videogame;

storing a set of commitment criteria associated with a commitment, wherein the set of commitment criteria comprises an activity criteria that defines ongoing and/or repeated actions required of a player over time to fulfill the commitment, a benefit criteria, and a penalty criteria;

generating a commitment invitation inviting the player to accept the commitment associated with the set of commitment criteria;

receiving a response to the commitment invitation from the player;

responsive to receiving an acceptance of the commitment invitation from the player, providing a benefit corresponding to the benefit criteria associated with the commitment is provided to the player within the videogame; and determining whether ongoing and/or repeated actions of the player over time within the videogame satisfy the activity criteria associated with the commitment.

12. The method of claim 11, further comprising, responsive to receiving an acceptance of the commitment invitation from the player and responsive to determining that the actions of the player within the videogame do not satisfy the activity criteria, providing a penalty corresponding to the penalty criteria associated with the commitment to the player within the videogame.

13. The method of claim 11, wherein the computer program modules are configured such that, responsive to the invitation module not receiving an acceptance of the commitment invitation from the player, neither the benefit corresponding to the benefit criteria nor a penalty associated with the commitment are provided to the player within the videogame.

14. The method of claim 11, wherein the commitment invitation conveys at least some of the commitment criteria to the player.

15. The method of claim 11, wherein the set of criteria further includes temporal criteria designating a time period, and wherein determining whether the activity criteria are satisfied is performed based only on the actions of the player within the videogame during the time period.

16. The method of claim 15, wherein the temporal criteria comprise one or more trigger parameters defining a trigger that triggers a commencement of the time period.

17. The method of claim 16, further comprising detecting the trigger.

18. The method of claim 15, wherein the temporal criteria comprise a duration of the time period.

19. The method of claim 11, wherein the activity criteria define one or more actions to be performed by the player within the videogame.

20. The method of claim 11, wherein the activity criteria define one or more actions to be avoided by the player within the videogame.

* * * * *